US010560600B2

(12) United States Patent
Shiraishi

(10) Patent No.: US 10,560,600 B2
(45) Date of Patent: Feb. 11, 2020

(54) ENCODING APPARATUS, ENCODING METHOD, AND RECORDING MEDIUM

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/260,328

(22) Filed: Jan. 29, 2019

(65) Prior Publication Data

US 2019/0238713 A1   Aug. 1, 2019

(30) Foreign Application Priority Data

Jan. 31, 2018   (JP) .................................. 2018-014634

(51) Int. Cl.
*H04N 1/32*   (2006.01)
*H04N 1/00*   (2006.01)

(52) U.S. Cl.
CPC ..... *H04N 1/32277* (2013.01); *H04N 1/00816* (2013.01); *H04N 1/00819* (2013.01)

(58) Field of Classification Search
CPC ........... H04N 1/32277; H04N 1/00819; H04N 1/00816
USPC ....................................................... 358/539
See application file for complete search history.

(56) References Cited

U.S. PATENT DOCUMENTS

| | | | |
|---|---|---|---|
| 5,337,168 A | 8/1994 | Fujii et al. | |
| 5,341,468 A | 8/1994 | Shiraishi et al. | |
| 5,349,610 A | 9/1994 | Sakamoto et al. | |
| 5,396,585 A | 3/1995 | Fujii et al. | |
| 5,448,690 A | 9/1995 | Shiraishi et al. | |
| 5,455,900 A | 10/1995 | Shiraishi et al. | |
| 5,459,822 A | 10/1995 | Izawa et al. | |
| 5,465,371 A | 11/1995 | Fujii et al. | |
| 5,502,802 A | 3/1996 | Shiraishi | |
| 5,551,019 A | 8/1996 | Izawa et al. | |

(Continued)

FOREIGN PATENT DOCUMENTS

| | | |
|---|---|---|
| JP | 2005-086601 | 3/2005 |
| JP | 2008-227872 | 9/2008 |
| JP | 2017-098789 | 6/2017 |

OTHER PUBLICATIONS

U.S. Appl. No. 07/932,357, filed Aug. 19, 1992 Naoto Shiraishi.

(Continued)

*Primary Examiner* — Allen H Nguyen
(74) *Attorney, Agent, or Firm* — Oblon, McClelland, Maier & Neustadt, L.L.P.

(57) ABSTRACT

An encoding apparatus includes circuitry. The circuitry is configured to read predetermined unit image data that is a predetermined plurality of pixel units of image data; generate pixel unit code data obtained by encoding the read predetermined unit image data on a pixel basis; generate predetermined unit code data obtained by encoding the read predetermined unit image data on a predetermined unit basis; compare a code length that is a data amount of the pixel unit code data with a data amount of the predetermined unit image data to make determination; and output the predetermined unit code data in a case where the code length is greater than the data amount of the predetermined unit image data and output the pixel unit code data in a case where the code length is not greater than the data amount, on basis of a result of the determination.

10 Claims, 12 Drawing Sheets

(56) References Cited

U.S. PATENT DOCUMENTS

| | | | |
|---|---|---|---|
| 5,732,204 A | 3/1998 | Fukushima et al. | |
| 5,739,826 A | 4/1998 | Shiraishi et al. | |
| 5,828,378 A | 10/1998 | Shiraishi | |
| 5,859,650 A | 1/1999 | Shiraishi | |
| 5,903,276 A | 5/1999 | Shiraishi | |
| 6,081,274 A | 6/2000 | Shiraishi | |
| 6,172,678 B1 | 1/2001 | Shiraishi | |
| 2002/0075532 A1 | 6/2002 | Shiraishi | |
| 2003/0053701 A1 | 3/2003 | Shiraishi | |
| 2003/0063813 A1 | 4/2003 | Shiraishi | |
| 2004/0150656 A1 | 8/2004 | Shiraishi | |
| 2005/0062994 A1 | 3/2005 | Shiraishi | |
| 2005/0151991 A1 | 7/2005 | Shiraishi | |
| 2005/0200910 A1 | 9/2005 | Kanoshima et al. | |
| 2005/0207667 A1 | 9/2005 | Shiraishi | |
| 2005/0246684 A1 | 11/2005 | Shiraishi | |
| 2005/0249427 A1 | 11/2005 | Shiraishi | |
| 2006/0072142 A1 | 4/2006 | Shiraishi | |
| 2006/0193528 A1 | 8/2006 | Shiraishi | |
| 2009/0051942 A1 | 2/2009 | Kanoshima et al. | |
| 2009/0060325 A1 | 3/2009 | Shiraishi | |
| 2009/0128857 A1 | 5/2009 | Shiraishi | |
| 2010/0238467 A1 | 9/2010 | Shiraishi | |
| 2011/0033125 A1 | 2/2011 | Shiraishi | |
| 2011/0063143 A1 | 3/2011 | Shiraishi | |
| 2011/0228325 A1 | 9/2011 | Shiraishi | |
| 2011/0231629 A1 | 9/2011 | Shiraishi | |
| 2011/0273736 A1 | 11/2011 | Shiraishi | |
| 2011/0280492 A1 | 11/2011 | Shiraishi | |
| 2012/0155779 A1 | 6/2012 | Shiraishi | |
| 2012/0162715 A1 | 6/2012 | Shiraishi | |
| 2012/0320389 A1 | 12/2012 | Shiraishi | |
| 2013/0094037 A1 | 4/2013 | Shiraishi | |
| 2013/0155466 A1 | 6/2013 | Shiraishi | |
| 2013/0176590 A1 | 7/2013 | Shiraishi | |
| 2014/0044370 A1* | 2/2014 | Odagiri | G06T 9/004 382/238 |
| 2014/0139858 A1 | 5/2014 | Shiraishi | |
| 2014/0226186 A1 | 8/2014 | Shiraishi | |
| 2014/0233067 A1 | 8/2014 | Shiraishi | |
| 2014/0362395 A1 | 12/2014 | Shiraishi | |
| 2015/0195553 A1* | 7/2015 | Tamatani | H04N 19/44 382/233 |
| 2015/0235113 A1 | 8/2015 | Shiraishi | |
| 2016/0277641 A1 | 9/2016 | Shiraishi | |
| 2016/0323582 A1* | 11/2016 | Takeda | H04N 19/176 |
| 2016/0360196 A1* | 12/2016 | Endo | H04N 19/103 |
| 2017/0076184 A1 | 3/2017 | Shiraishi | |
| 2017/0201643 A1 | 7/2017 | Shiraishi et al. | |
| 2017/0256026 A1 | 9/2017 | Shiraishi | |
| 2017/0302817 A1 | 10/2017 | Shiraishi | |
| 2018/0255300 A1 | 9/2018 | Shiraishi | |

OTHER PUBLICATIONS

U.S. Appl. No. 07/827,635, filed Jan. 29, 1992 Tatsuya Fujii, et al.
U.S. Appl. No. 08/076,989, filed Jun. 15, 1993 Tatsuya Fujii, et al.
U.S. Appl. No. 08/597,344, filed Feb. 6, 1996 Tatsuya Fujii, et al.
U.S. Appl. No. 08/102,050, filed Aug. 4, 1993 Naoto Shiraishi, et al.
U.S. Appl. No. 08/317,116, filed Oct. 3, 1994 Naoto Shiraishi, et al.
U.S. Appl. No. 08/381,102, filed Jan. 31, 1995 Masanobu Fukushima, et al.
U.S. Appl. No. 07/727,832, filed Jul. 9, 1991 Naoto Shiraishi.

* cited by examiner

ENCODING APPARATUS, ENCODING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-014634, filed on Jan. 31, 2018, in the Japan Patent Office, the entire disclosure of which is hereby incorporated by reference herein.

BACKGROUND

Technical Field

The present disclosure relates to an encoding apparatus, an encoding method, and a recording medium.

Discussion of the Background Art

Image forming apparatuses that output image data read by a scanner or the like with a printer engine are known to divide the image data by a certain unit, such as pixel unit, block unit, line unit, or band unit, and temporarily store code data that is a result of compression processing in a memory on a divided image data basis. After the storage, each code data is read from the memory, decoded, and transferred to a plotter within a printing speed of the printer engine.

SUMMARY

In an aspect of the present disclosure, there is provided an encoding apparatus including circuitry. The circuitry is configured to read predetermined unit image data that is a predetermined plurality of pixel units of image data; generate pixel unit code data obtained by encoding the read predetermined unit image data on a pixel basis; generate predetermined unit code data obtained by encoding the read predetermined unit image data on a predetermined unit basis; compare a code length that is a data amount of the pixel unit code data with a data amount of the predetermined unit image data to make determination; and output the predetermined unit code data in a case where the code length is greater than the data amount of the predetermined unit image data and output the pixel unit code data in a case where the code length is not greater than the data amount of the predetermined unit image data, on basis of a result of the determination.

In another aspect of the present disclosure, there is provided an encoding apparatus includes a memory and circuitry. The circuitry is configured to read predetermined unit image data that is a predetermined plurality of pixel units of image data; store the read predetermined unit image data in the memory; generate pixel unit code data obtained by encoding the read predetermined unit image data on a pixel basis; generate predetermined unit code data obtained by encoding the predetermined unit image data stored in the memory on a predetermined unit basis; compare a code length that is a data amount of the pixel unit code data with a data amount of the predetermined unit image data to make determination; and output the encoded predetermined unit code data in a case where the code length is greater than the data amount of the predetermined unit image data and output the pixel unit code data in a case where the code length is not greater than the data amount of the predetermined unit image data, on basis of a result of the determination.

In still another aspect of the present disclosure, there is provided an encoding method that includes reading predetermined unit image data that is a predetermined plurality of pixel units of image data; storing the read predetermined unit image data; generating pixel unit code data obtained by encoding the read predetermined unit image data on a pixel basis; comparing a code length that is a data amount of the pixel unit code data with a data amount of the predetermined unit image data to make determination; and outputting predetermined unit code data generated by encoding the predetermined unit image data stored by the storing, on a predetermined unit basis, in a case where the code length is greater than the data amount of the predetermined unit image data, and outputting the pixel unit code data in a case where the code length is not greater than the data amount of the predetermined unit image data, on basis of a result of the determination.

In still yet another aspect of the present disclosure, there is provided a non-transitory computer-readable recording medium storing encoding program code for causing an encoding apparatus to execute processing. The processing includes reading predetermined unit image data that is a predetermined plurality of pixel units of image data; storing the read predetermined unit image data; generating pixel unit code data obtained by encoding the read predetermined unit image data on a pixel basis; comparing a code length that is a data amount of the pixel unit code data with a data amount of the predetermined unit image data to make determination; and outputting predetermined unit code data generated by encoding the predetermined unit image data stored by the storing, on a predetermined unit basis, in a case where the code length is greater than the data amount of the predetermined unit image data, and outputting the pixel unit code data in a case where the code length is not greater than the data amount of the predetermined unit image data, on basis of a result of the determination.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
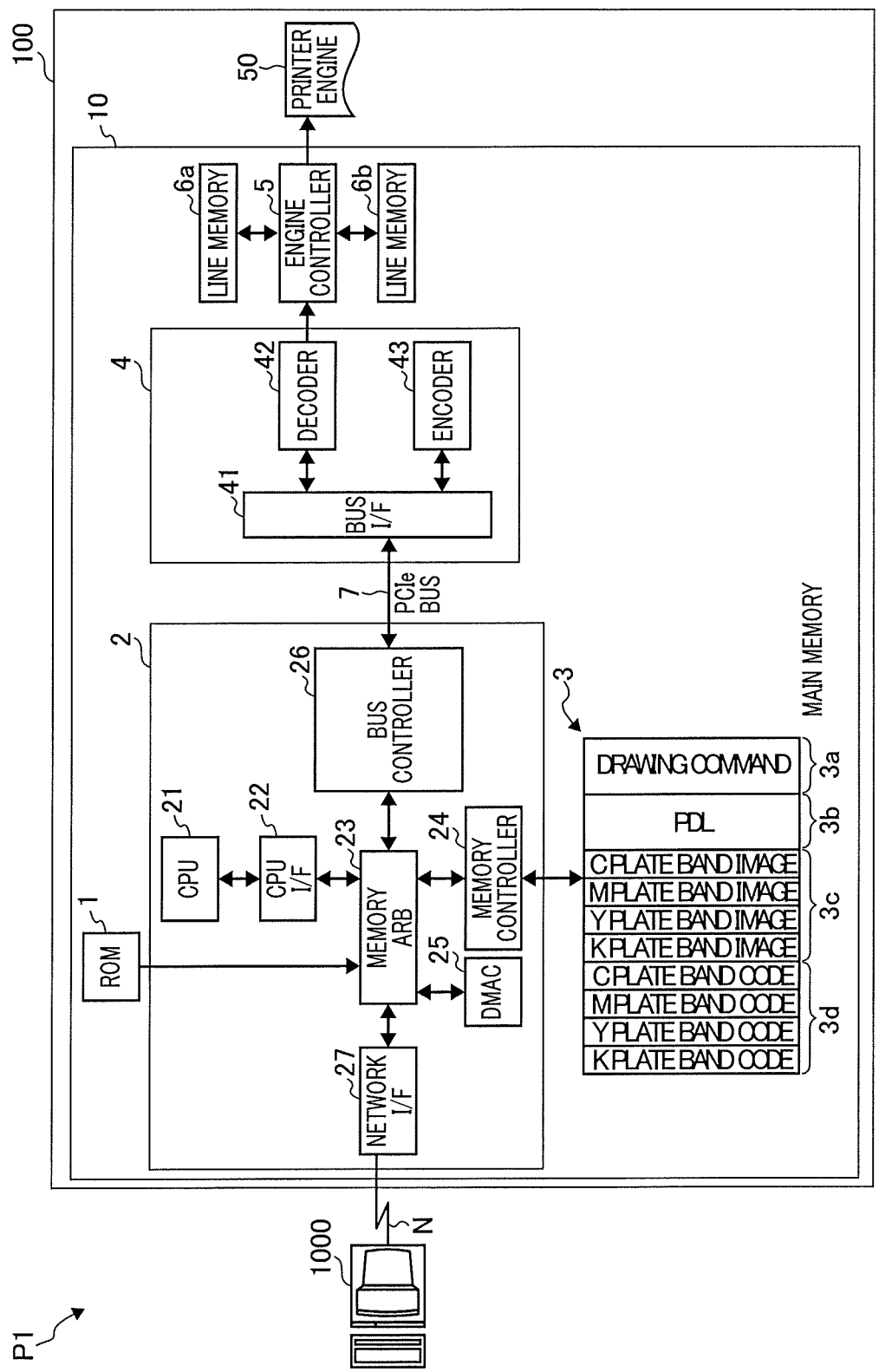
FIG. 1 is a hardware configuration diagram of an image forming apparatus that is an encoding apparatus of a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

Hereinafter, embodiments of the present disclosure will be described with reference to the accompanying drawings. In the drawings for describing embodiments of the present disclosure, description of constituent elements such as members or constituent parts having the same function or shape may be omitted in some cases after once described by being provided with the same reference numerals as long as the constituent elements are distinguishable.

First, a hardware configuration of an encoding apparatus according to the first embodiment of the present disclosure will be described. As illustrated in FIG. 1, an image forming apparatus 100 that is an encoding apparatus and a terminal device 1000 such as a personal computer (PC) are connected by a network N to constitute a printing system P1. Here, the network N is a concept including a local area network (LAN), the Internet, the Internet via a LAN, and the like. The terminal device 1000 may be connected to the network N by wired means or may be a so-called mobile terminal by wireless connection. A plurality of the terminal devices 1000 may be connected to one image forming apparatus 100.

The image forming apparatus 100 is a so-called multi-function peripheral (MFP) having, as an example, a copy function, a facsimile (FAX) function, a print function, a scanner function, a function to save and distribute input images (documents read by the scanner function or images input by the printer function or the FAX function), and a function as an information processing apparatus to process various types of information in a complex manner. Note that, in the present embodiment, "image data" processed by the image forming apparatus 100 includes data that does not include an image as content, that is, data including only text information.

The image data includes a set of pixel data, and the pixel data is digital data made of a bit string. As a pixel region constituting the image data, there are a line unit in which one page of image data is divided in a line manner, a band unit including a plurality of lines, and a block unit including a plurality of pixels x a plurality of pixels. Hereinafter, "band image" means a band unit of image data and "band code" means code data obtained by encoding the band unit of image data.

The image forming apparatus 100 includes a printer controller board 10 and a printer engine 50 that prints an image on a storage medium such as a paper. The arrows connecting the devices and members in the image forming apparatus 100 represent buses, and these buses enable transfer of data within the image forming apparatus 100.

The terminal device 1000 creates print instruction data for the image forming apparatus 100 according to an operation of a print instruction input by a user, and transmits the print instruction data to the image forming apparatus 100. Since the print instruction data is written in a page description language (PDL) that is a language used to describe and instruct an output image to a printer or the like, the print instruction data may be hereinafter referred to as PDL data.

The printer controller board 10 includes a read only memory (ROM) 1, a memory controller built-in central processing unit (CPU) 2, a main memory 3, an image processing controller 4, an engine controller 5, and line memories 6a and 6b. The memory controller built-in CPU 2 and the image processing controller 4 are connected by a PCIe bus 7 as a serial transfer interface, as an example, among the buses connecting the devices and members.

Here, the main memory 3 includes a storage area including a drawing command area 3a (illustrated as "drawing command" in FIG. 1), a PDL data area 3b (illustrated as "PDL data" in FIG. 1), a band image area 3c, and a band code area 3d.

The band image area 3c includes a C plate band image area (illustrated as "C plate band image" in FIG. 1) that is a storage area of a cyan band image, an M plate band image area (illustrated as "M plate band image" in FIG. 1) that is a storage area of a magenta band image, a Y plate band image area (illustrated as "Y plate band image" in FIG. 1) that is a storage area for a yellow band image, and a K plate band image area (illustrated as "K plate band image" in FIG. 1) that is a storage area of a black band image.

The band code area 3d includes a C plate band code area (illustrated as "C plate band code" in FIG. 1) that is a storage area of a cyan band code, an M plate band code area (illustrated as "M plate band code" in FIG. 1) that is a storage area of a magenta band code, a Y plate band code area (illustrated as "Y plate band code" in FIG. 1) that is a storage area for a yellow band code, and a K plate band code area (illustrated as "K plate band code" in FIG. 1) that is a storage area of a black band code.

The ROM 1 stores various programs related to the operation of the image forming apparatus 100 and font information such as characters.

The memory controller built-in CPU 2 incorporates, as will be described below, a CPU 21 and a memory controller 24, and performs overall control regarding the devices mounted on the printer controller board 10 and data exchange among the devices.

The memory controller built-in CPU 2 includes the CPU 21, a CPU interface (I/F) 22, a memory arbiter 23 (illustrated as "memory ABR" in FIG. 1), the memory controller 24, a direct memory access controller (DMAC) 25, a bus controller 26, and a network I/F 27.

The CPU 21 controls the entire printer controller board 10 and functions as a printer controller of the printing system P1. As an example, the CPU 21 analyzes the PDL data sent from the terminal device 1000, generates image data of CMYK images, and stores the image data in areas corresponding to the respective colors of the PDL data area 3b of the main memory 3. Further, the CPU 21 analyzes the PDL data sent from the terminal device 1000, generates image data of CMYK images, and generates CMYK image portions in the band image area 3c.

The CPU I/F 22 is an interface of the CPU 21, and is connected to the main memory 3 and various controllers via the memory arbiter 23.

The memory arbiter 23 arbitrates between the main memory 3 and various controllers.

The memory controller 24 controls the main memory 3 and is connected to various controllers and the CPU 21 via the memory arbiter 23.

The direct memory access controller (DMAC) 25 controls direct memory access between the memory controller 24 and the image processing controller 4.

The bus controller 26 arbitrates between the buses and peripheral controllers connected to the buses.

The network I/F 27 is connected to the network N, receives various data and commands from the network N, and is connected to various controllers via the memory arbiter 23.

The image processing controller 4 includes, for example, an application specific integrated circuit (ASIC), and encodes image data to generate code data and decodes code data.

The engine controller 5 controls printing executed by the printer engine 50.

The line memories 6a and 6b temporarily store a line unit of image data before transferred by the engine controller 5 to the printer engine 50 according to the control of the engine controller 5.

The image processing controller 4 further includes a bus I/F 41, a decoder 42, and an encoder 43.

The bus I/F 41 is an interface between the image processing controller 4 and the bus, and connects the image processing controller 4 and the memory controller built-in CPU 2 via the PCIe bus 7.

The decoder 42 decodes CMYK plate band code data acquired from the band code area 3d of the main memory 3 via the memory controller 24 and the bus, and transfers image data that is a result of the decoding to the engine controller 5.

The encoder 43 reads and encodes CMYK plate band image data acquired from the band image area 3c of the main memory 3 via the memory controller 24 and the bus, and stores code data that is a result of the encoding to the band code area 3d via the memory controller 24 and the bus.

Note that the image forming apparatus 100 may further include a non-volatile storage medium, for example, a hard disk drive (HDD), or the like. Further, since the image forming apparatus 100 includes the encoder 43, the image forming apparatus 100 can also be referred to as an encoding apparatus.

Figure 2:
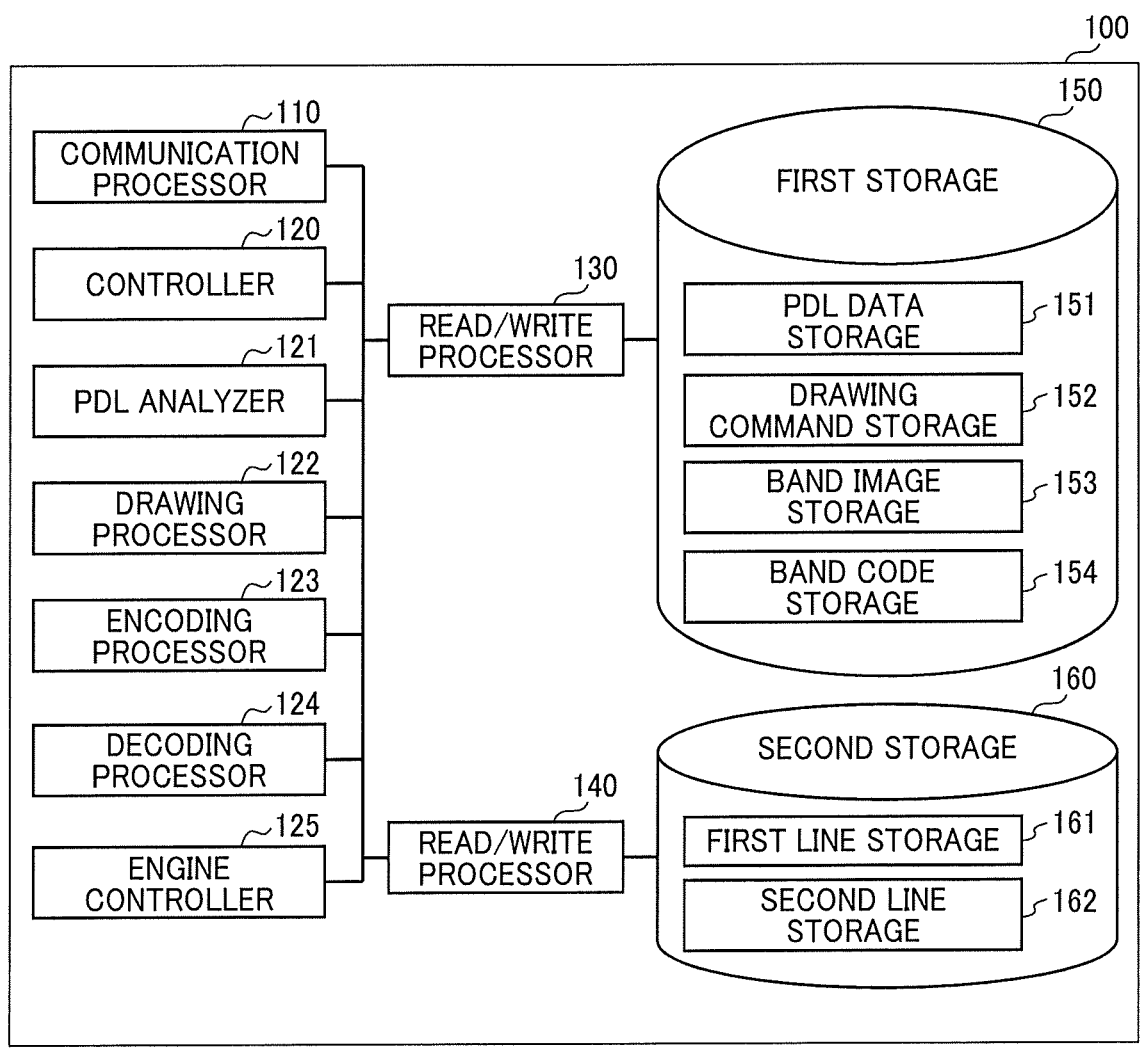
FIG. 2 is a functional block diagram of the image forming apparatus according to the first embodiment.

FIG. 2 is a functional block diagram of the image forming apparatus 100.

The image forming apparatus 100 includes a communication processor 110, a controller 120, a read/write processor 130, a read/write processor 140, a first storage 150, and a second storage 160.

The communication processor 110 is implemented by processing of the network I/F 27, and executes a function to communicate with an external device such as the terminal device 1000 via the network.

The controller 120 is implemented by the CPU 21 executing a program stored in the ROM 1, the HDD, or the like, and functions as a printer controller that controls the entire printing system P1.

The image forming apparatus 100 includes a PDL analyzer 121, a drawing processor 122, an encoding processor 123, a decoding processor 124, and an engine controller 125.

The PDL analyzer 121 is implemented by the CPU 21 executing a program stored in the ROM 1, the HDD, or the like, and analyzes the PDL data received from the terminal device 1000 to generate image data.

The drawing processor 122 is implemented by the CPU 21 executing a program stored in the ROM 1, the HDD, or the like, and creates image data from a drawing command.

The encoding processor 123 is implemented by the encoder 43, and generates band code data obtained by encoding image data.

The decoding processor 124 is implemented by the decoder 42, decodes band code data, and generates image data.

The engine controller 125 is implemented by the engine controller 5, and controls printing of an image by the printer engine 50.

The read/write processor 130 is implemented by the memory controller 24, and executes functions to store various data in the first storage 150 and read the stored various data.

The read/write processor 140 is implemented by the engine controller 5, and executes functions to store image data in the second storage 160 and read the stored image data.

The first storage 150 is implemented by the main memory 3. The first storage 150 includes a PDL data storage 151, a drawing command storage 152, a band image storage 153, and a band code storage 154. The PDL data storage 151, the drawing command storage 152, the band image storage 153, and the band code storage 154 are respectively implemented by the PDL data area 3b, the drawing command area 3a, the band image area 3c, and the band code area 3d, and respectively execute functions to store the PDL data, the drawing command, the band image data as the image data, and the band code data.

The second storage 160 includes a first line storage 161 and a second line storage 162. The first line storage 161 and the second line storage 162 are respectively implemented by the line memory 6a and the line memory 6b, and store the line unit of image data that is a decoded result.

Figure 3:
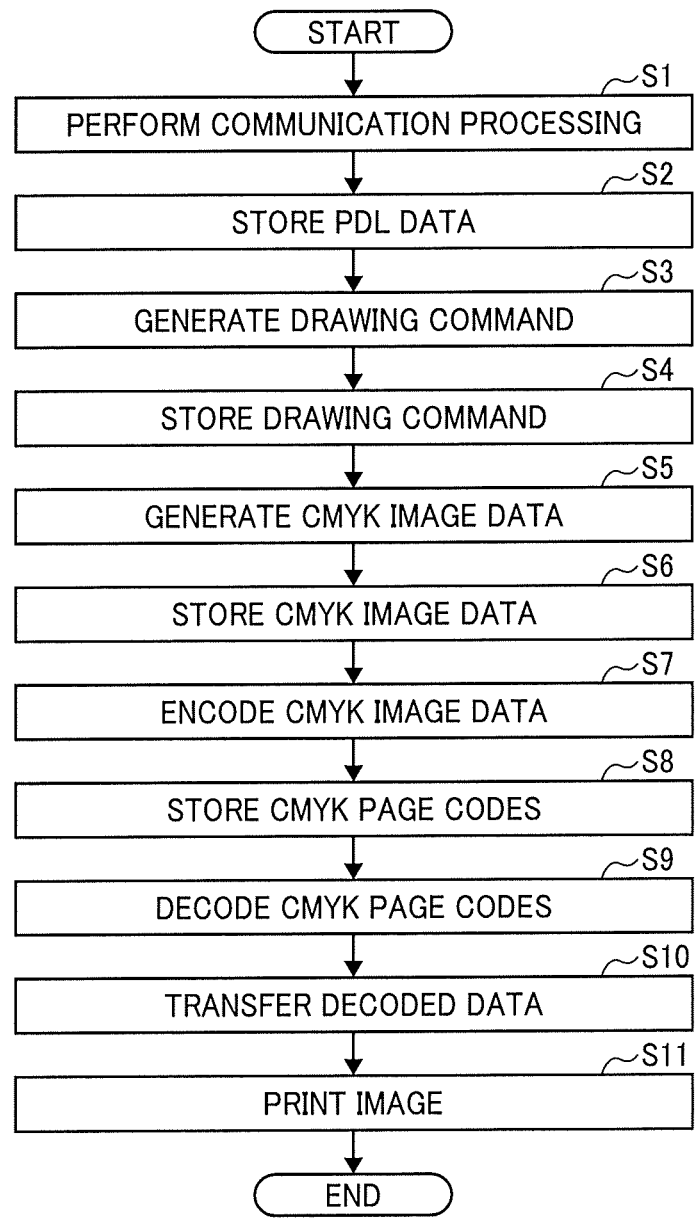
FIG. 3 is a flowchart of image forming processing according to the first embodiment.

FIG. 3 is a flowchart of image forming processing executed by the image forming apparatus 100. The controller 120 as a printer controller controls the entire processing flow.

First, the communication processor 110 performs communication processing of receiving the PDL data generated by the terminal device 1000 (S1).

The read/write processor 130 causes the PDL data storage 151 to store the PDL data received by the communication processor 110 (S2).

The PDL analyzer 121 reads the PDL data via the read/write processor 130 and generates a drawing command from the PDL data (S3).

The read/write processor 130 causes the drawing command storage 152 to store the drawing command generated by the drawing processor 122 (S4).

The drawing processor 122 reads the drawing command via the read/write processor 130 and generates CMYK image data from the drawing command (S5).

The read/write processor 130 causes the band image storage 153 store the image data generated by the drawing processor 122 (S6).

The encoding processor 123 reads the image data from the band image storage 153 via the read/write processor 130 and encodes the image data to generate CMYK band code data (S7).

The read/write processor 130 causes the band code storage 154 to store the band code data generated by the encoding processor 123 (S8).

The decoding processor 124 reads and decodes the band code data via the read/write processor 130, and transfers the decoded data, that is, the image data to the engine controller 125 (S10).

The engine controller 125 performs printing on a storage medium such as a paper on the basis of the transferred image data (S11).

Figure 4:
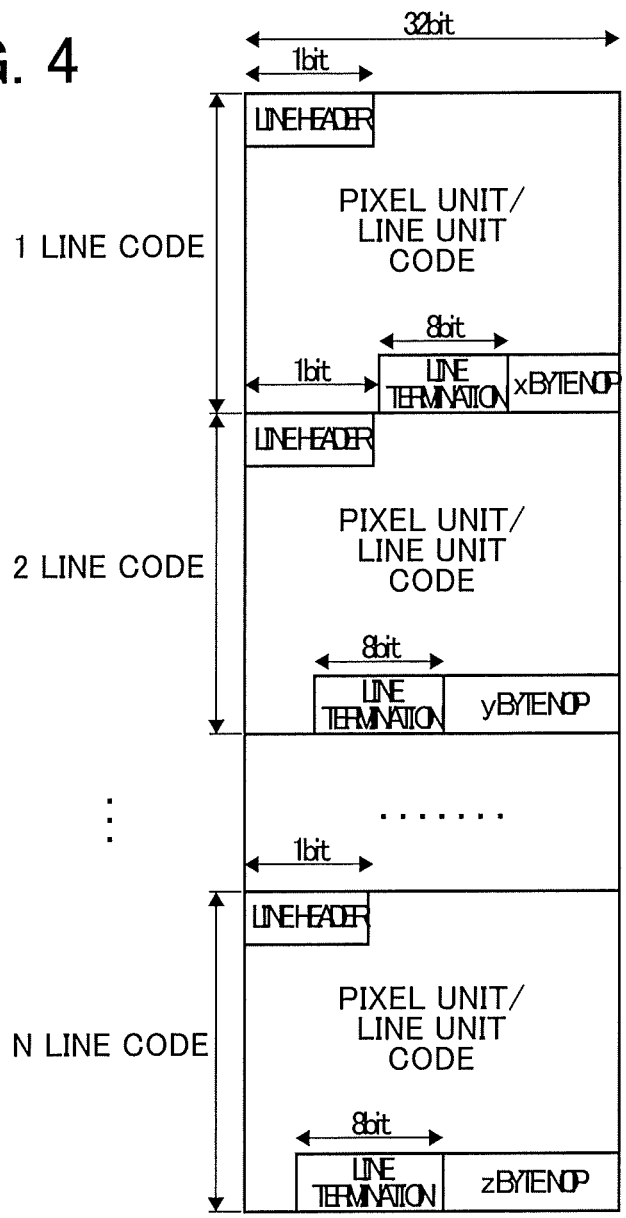
FIG. 4 is an example of a data structure of code data.

Here, a data structure of the code data will be described. FIG. 4 is a diagram illustrating an example of a data structure of code data obtained by encoding image data of one band including N lines.

In FIG. 4, as illustrated by 1 line code to N line code, the band image data is encoded every line that constitutes the band image data, and encoding is completed per line. There is a line header at a head of each line code. The line header indicates that a succeeding code is either pixel unit code data or line unit code data.

Following the line header, the portion described as "pixel unit/line unit code" in FIG. 4 indicates pixel unit code data or line unit code data. Next, "line termination" indicates the end of each line data. In a case where the area is left over behind the terminal code, remaining bits of data is added. In FIG. 4, the remaining bits of data for the 1 line code, 2 line code, and N line code are respectively represented as x byte NOP, y byte NOP, and z byte NOP.

Here, characteristics for generating the above-described pixel unit code data and the line unit code data will be described. First, two types of encoding of encoding on a pixel basis and encoding on a line basis are used for line-by-line encoding. At this time, code data as a result of the encoding on a pixel basis is called pixel unit code data, with respect to image data including a plurality of pixels that is one line of pixel numbers. Then, code data as a result of the encoding on a line basis is called line unit code data, with respect to image data including one line of a plurality of pixels.

The pixel unit code (byte unit) includes one line of compressed pixel data following the line header indicating the pixel unit code. The line unit code includes one line of uncompressed pixel data following the line header indicating the line unit code.

The pixel unit code is an encoding method with a high compression rate in order to encode data on a pixel basis but a high expansion rate in the case of expansion. In contrast, line-by-line encoding encodes data on a line basis, and is thus an encoding method with a small expansion rate (a small code length at the worst compression rate and small magnification of the data amount of a line) in the case of encoding but cannot compress a large data amount. In other words, the compression rate is low because one line of uncompressed pixel data is included as is but the code data does not greatly expand and the maximum amount of the code data is determined.

Note that the compression method may be, but is not limited to, reversible encoding such as Huffman encoding, LZ encoding method, or run length encoding method, or lossy encoding such as encoding by the Joint Photographic Experts Group (JPEG) method. Different encoding methods may be used for the pixel-by-pixel encoding and the line-by-line encoding.

Figure 5A:
FIGS. 5A and 5B are examples of line header of code data.
Figure 5B:

FIGS. 5A and 5B are diagrams illustrating examples of the line header of the code data. "0" is given to the line code of the pixel unit code as the line header, as illustrated in FIG. 5A, and "1" is given to the line code of the line unit code as the line header, as illustrated in FIG. 5B.

Figure 6:
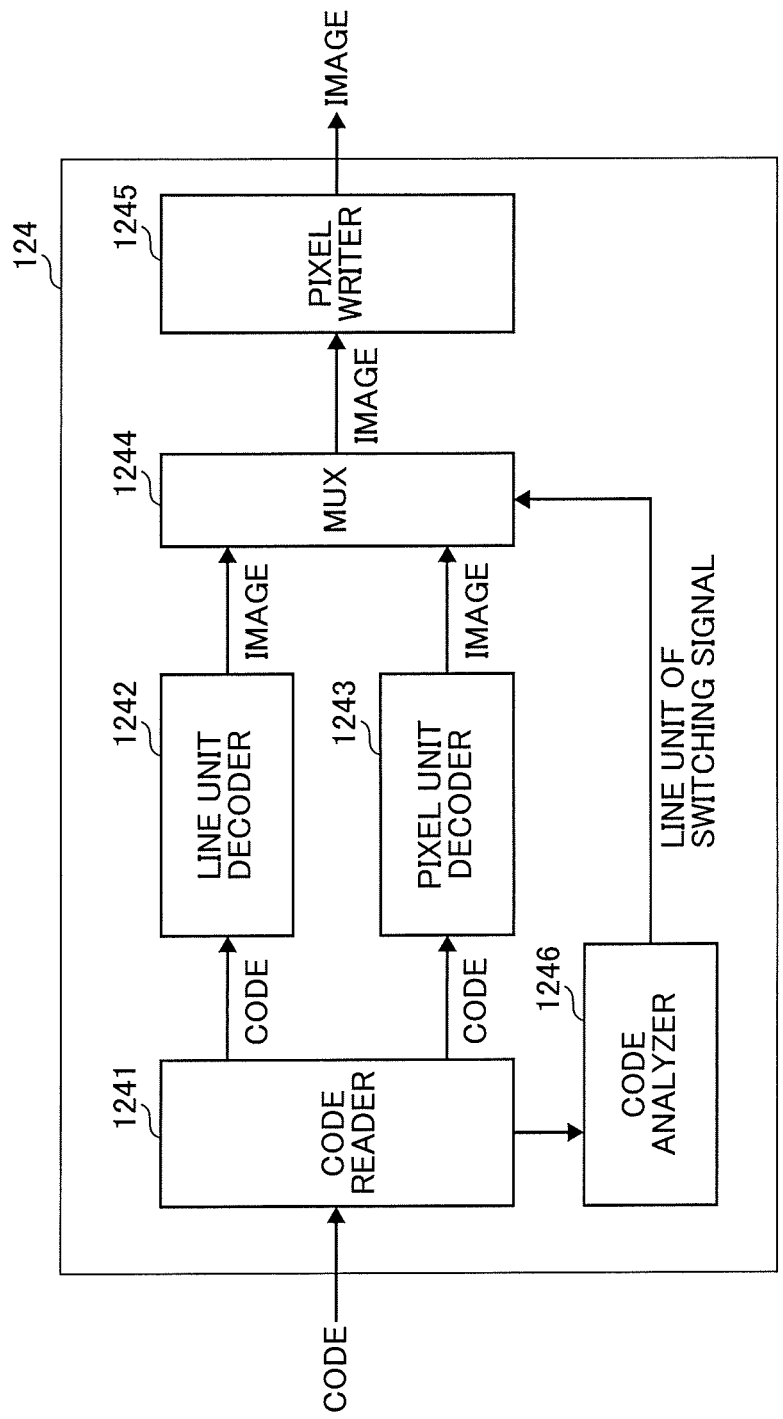
FIG. 6 is a functional block diagram of a decoding processor.

FIG. 6 is a functional block diagram of the decoding processor 124. Steps of decoding processing will be described with reference to FIG. 6. Note that, in FIG. 6, the image data is abbreviated as "image" and the code data is abbreviated as "code".

A code reader 1241 reads the code data from the band code storage 154, and inputs the read code data to a line unit decoder 1242 and a pixel unit decoder 1243.

The line unit decoder 1242 decodes the received code data and inputs the code data to an output code selector 1244. Note that the output code selector 1244 is illustrated as MUX (multiplexer) in FIG. 6.

The pixel unit decoder 1243 decodes the received code data and inputs the code data to the output code selector 1244.

A code analyzer 1246 recognizes the first header of the code data read by the code reader 1241 and determines whether the code data is the line unit code data or the pixel unit code data. Then, the line unit decoder 1242 and the pixel unit decoder 1243 are controlled to input a switching signal to the output code selector 1244. In the present embodiment, the code data is determined to be the pixel unit code data when the header is 0 and is determined to be the line unit code data when the header is 1.

The output code selector 1244 is switched by the switching signal from the code analyzer 1246, and inputs one of the image data input from the line unit decoder 1242 and the pixel unit decoder 1243 to a pixel writer 1245.

The pixel writer 1245 performs storing by wiring a pixel value that is the image data received from the output code selector 1244 to either the first line storage 161 or the second line storage 162 via the engine controller 125 and the read/write processor 140.

Here, the data transferred in the printing system P1 at the time of executing the flow described in FIG. 3 will be described. Hereinafter, data transfer processing T1, T2, T3, and T4 will be described again with reference to FIG. 1.

The controller 120 transfers the band image data in the band image area 3c to the encoder 43 (T1). Then, the encoder 43 encodes the image data to generate band code data.

Next, the controller 120 transfers the band code data from the encoder 43 to the main memory 3 in order to store the band code data to the band code area 3d via various buses (T2). Further, the controller 120 transfers the band code data in the band code area 3d to the decoder 42 via various buses in synchronization with a printing operation of the printer engine 50 (T3). Then, the decoder 42 decodes the transferred band code data.

Then, the controller 120 transfers the decoded image data to the engine controller 5, and the engine controller 5 sequentially writes the band image data to either one of the two line memories 6a and 6b on a line basis and after that, transfers the image data from the line memory 6a or 6b, to which the image data has been written, to the printer engine 50. That is, the controller 120 transfers the image data that is a decoded result from the decoder 42 to the engine controller 5 as transfer processing T4, and the image data is transferred line by line from the engine controller 5 to the line memory 6a or the line memory 6b, and is then transferred from the line memory 6a or the line memory 6b to the printer engine 50 via the engine controller 5 again in synchronization with the printing operation of the printer engine 50 (T4).

In T4, the printer engine 50 includes two line memories 6a and 6b and transfers the image data line by line at the timing synchronized with the printing operation of the printer engine 50 using the line memory 6a or 6b. Therefore, if the data transfer processing in T3 and T4 is not in time with the linear speed of one line of the printer engine 50 due to a low transfer rate of the PCIe bus 7, for example, abnormality occurs in a printed image.

Here, in conventional encoding, the code length when encoding a line unit of image data is not controlled. Therefore, the code data sometimes expands. In that case, the amount of code data to be transferred increases. In addition, if a condition to slow down the data transfer speed other than the amount of data to be transferred, such as a condition that the transfer speed of the bus is not so high or a condition that WAIT enters due to memory contention in the CPU 21 coincides, the time required for transfer further increases and necessary image data cannot be sometimes transferred in time with the linear speed of the printer engine 50.

Therefore, the present embodiment provides an encoding apparatus and an encoding method that prevent code data from expanding on a line basis as a result of carrying out encoding.

Figure 7:
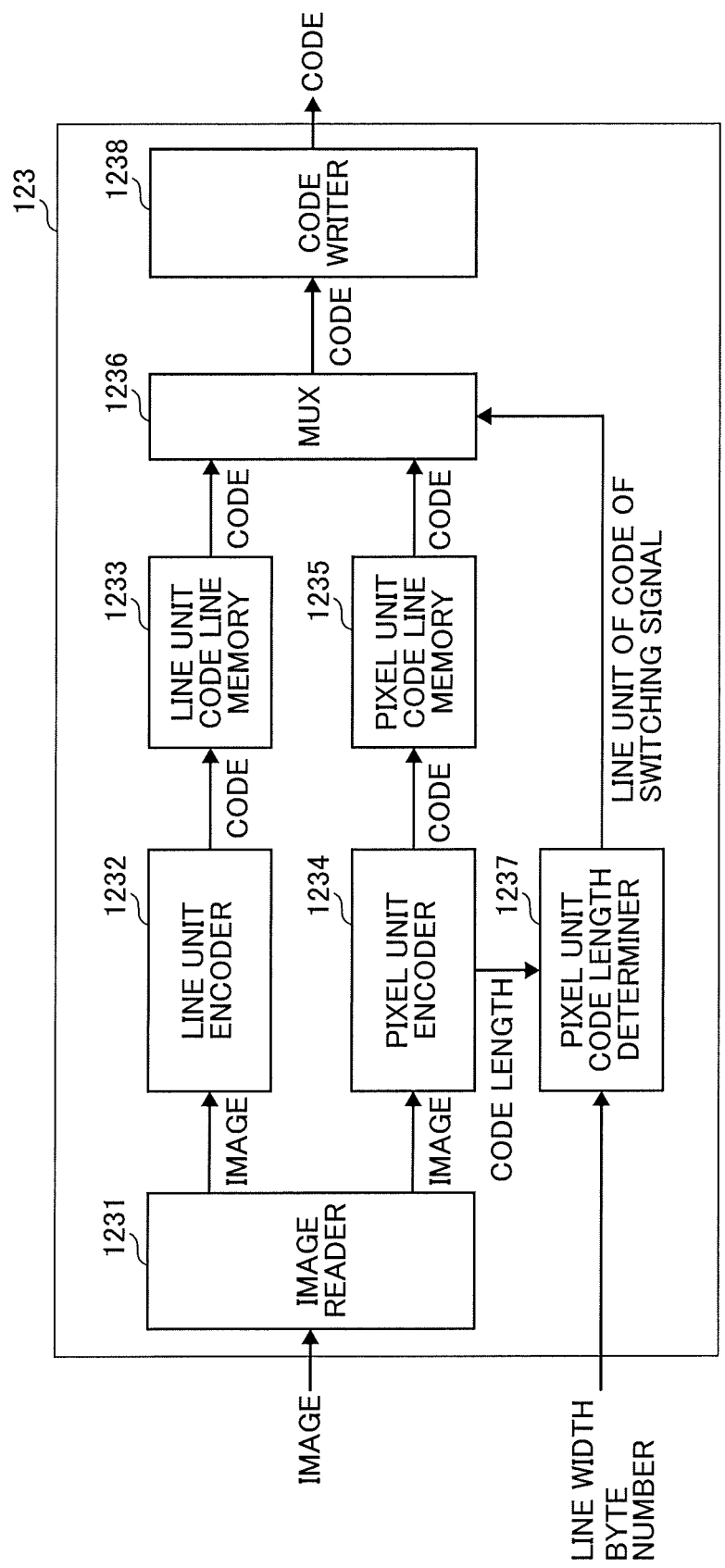
FIG. 7 is a first example of a functional block diagram of an encoding processor.

FIG. 7 is a functional block diagram of an encoding processor. Note that steps of encoding processing of the first embodiment will be described with reference to the block diagram of FIG. 7. Note that, in FIG. 7, the image data is abbreviated as "image" and the code data is abbreviated as "code".

An image reader 1231 has a function to read a predetermined plurality of pixel units of image data. That is, the image data transferred by the controller 120 and input to the encoding processor 123 is read on a predetermined plurality of pixels basis. In the present embodiment, as an example, a case in which the image reader 1231 reads the band image data input to the encoding processor 123 on one line of a plurality of pixels basis, as a predetermined plurality of pixel units of image data, will be described. However, the embodiment is not limited to this example.

The image reader 1231 simultaneously inputs predetermined unit image data that is the read predetermined plurality of pixel units of image data to a line unit encoder 1232 as a predetermined unit encoder and a pixel unit encoder 1234 as a pixel unit encoder, as an example.

The line unit encoder 1232 encodes the image data on a line basis, and writes the line unit code data as an encoding result to a line unit code line memory 1233 that is a predetermined unit code data storage.

The line unit code line memory 1233 temporarily stores one line of encoded line unit code data.

The pixel unit encoder 1234 encodes the image data on a pixel basis, and writes the pixel unit code data as an encoding result to a pixel unit code line memory 1235 that is a pixel unit code data storage. Further, the pixel unit encoder 1234 inputs a code length of the pixel unit code data, for example, a byte number, to a pixel unit code length determiner 1237 to be described below.

The pixel unit code line memory 1235 temporarily stores one line of encoded line unit code data on a pixel basis.

The pixel unit code length determiner 1237 determines the code length of the pixel unit code data. That is, first, the pixel unit code length determiner 1237 acquires one line of width, for example, a byte number (illustrated as line width byte number in FIG. 7) of the image data transferred by the controller 120 and input to the encoding processor 123. Then, the pixel unit code length determiner 1237 compares the one line of width of the image data with the code length of the one line of pixel unit code input from the pixel unit encoder 1234.

Then, when the code length of the pixel unit code is longer than the one line of width of the image data, occurrence of expansion of data due to the pixel-by-pixel encoding is determined. In this case, the amount of data to be transferred can be small on the system by selecting the line unit code data rather than the pixel unit code data in which expansion of data has occurred. Therefore, the pixel unit code length determiner 1237 inputs the switching signal to cause an output code selector 1236 to use the line unit code data. In this way, the pixel unit code length determiner 1237 inputs which code is to be used to the output code selector 1236 as a result of determination.

The output code selector 1236 performs processing of selecting the code to be output on the basis of the determination result of the pixel unit code length determiner 1237. Note that the output code selector 1236 is illustrated as MUX (multiplexer) in FIG. 7. Then, a code writer 1238 performs storing by writing the band code input from the output code selector 1236 to the band code storage 154.

Note that the above-described pixel unit code length determiner 1237 has compared the one line of width of the image data with the code length of the one line of pixel unit code to determine the expansion of the pixel-by-pixel encoding. However, a code length of one line of line unit code may be used in place of the one line of width of the image data. That is, when the code length of one line of pixel unit code is longer than the code length of one line of line unit code, occurrence of expansion of the pixel-by-pixel encoding can be determined.

Figure 8:
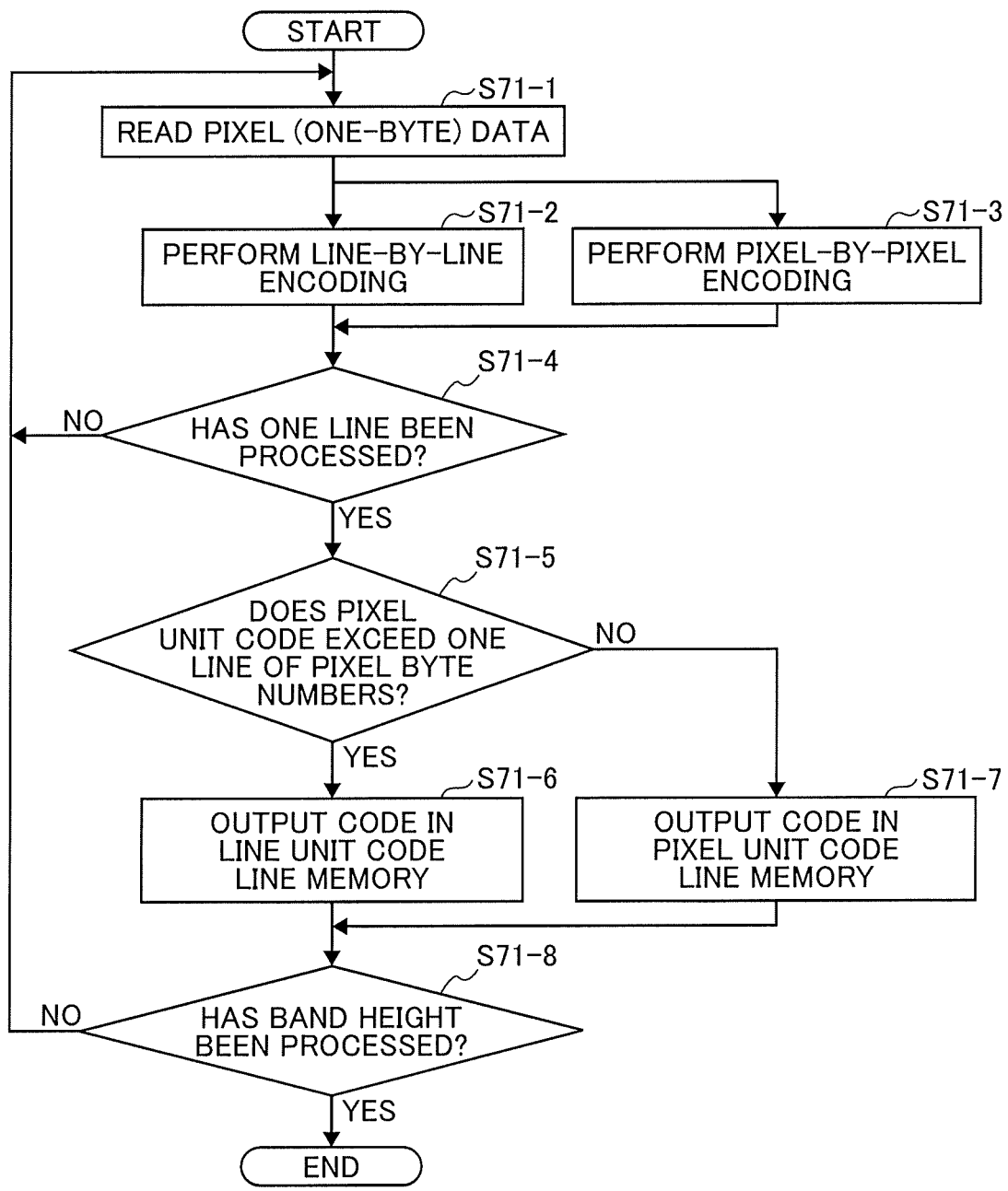
FIG. 8 is a first example of a flowchart of encoding processing.

FIG. 8 is a flowchart of the encoding processing of the encoding processor 123 in FIG. 7. In particular, steps up to a step of inputting code data to the output code selector 1236 will be described.

First, the image reader 1231 reads, as an image reading step, pixel data, that is, one byte of pixel data, on a predetermined plurality of pixels basis, for example, on a line basis, and inputs the image data to the line unit encoder 1232 and the pixel unit encoder 1234 (S71-1). This input is simultaneously performed as an example.

The line unit encoder 1232 to which the image data has been input performs the encoding on a line basis as a predetermined unit-by-unit encoding step, and stores the code data to the line unit code line memory 1233 (S71-2). Further, the pixel unit encoder 1234 that has received the data performs the encoding on a pixel basis as a pixel-by-pixel encoding step, and writes the code data to the pixel unit code line memory 1235 (S71-3). The encoding on a line basis and the encoding on a pixel basis are simultaneously performed as an example.

The encoding processor 123 repeats the data read to the code data write of S71-1 to S71-3 until completion of the encoding processing for one line, and moves onto the next step when the processing for one line is completed (S71-4).

In the next step, the pixel unit code length determiner 1237 determines, as a pixel unit code length determining step, whether the code length of the one line of pixel unit code exceeds the one line of width of the one line of image data, and inputs the switching signal to the output code selector 1236 (S71-5).

The output code selector 1236 selects and outputs, as an output code selecting step, the code in the line unit code line memory 1233 in a case where the code length of the pixel unit code exceeds the one line of the image data (S71-6) or the code in the pixel unit code line memory 1235 in a case where the code length of the pixel unit code does not exceeds the one line of the image data (S71-7), on the basis of the switching signal of a line unit of code from the pixel unit code length determiner 1237.

Then, the encoding processor 123 repeats the processing of S71-1 to S71-7 until completion of the encoding processing for band height, and terminates the processing when the processing for one band is completed (S71-8).

In a case where the code data as a result of the encoding on a pixel basis, in other words, the encoding on a byte basis exceeds a predetermined unit of byte numbers, for example, one line unit of byte numbers, one line unit of code data is output, whereby expansion of code data is suppressed on a predetermined unit basis, that is, on a line basis in the present embodiment.

That is, as described in FIG. 4, the line-by-line encoding has a low compression rate but the code data does not greatly expand and the maximum code length is determined. Meanwhile, the pixel unit (byte unit) code is an encoding method with a high compression rate in order to encode data on a pixel basis but a high expansion rate in the case of expansion. According to the present embodiment, the pixel unit code data as a result of pixel-by-pixel encoding is used in the case where the compression rate of the pixel-by-pixel encoding is high, and the line unit code data as a result of line-by-line encoding is used in the case where the data is expanded in the pixel-by-pixel encoding. Therefore, encoding with a high compression rate and suppressed expansion of code data can be performed on a line basis.

As a result of such encoding, transfer data via the bus at the time of printing falls within a range where the maximum amount is determined on a predetermined plurality of pixels basis, for example, on a line basis. In the present embodiment, the maximum data amount on a line basis is a data amount of line unit code data, that is, a data amount of the header and one line of unencoded pixel data. Therefore, the maximum data amount handled in the printing system can be estimated, and occurrence of an unexpected delay in data transfer can be prevented. As a result, the linear speed can be maintained and occurrence of abnormal image can be prevented.

Further, the line-by-line encoding and the pixel-by-pixel encoding are executed and the code data are stored in parallel on a line basis. Therefore, appropriate code data is simply selected and output from the already stored code data, and wasteful processing time is not consumed and high-speed processing is possible.

Figure 9:
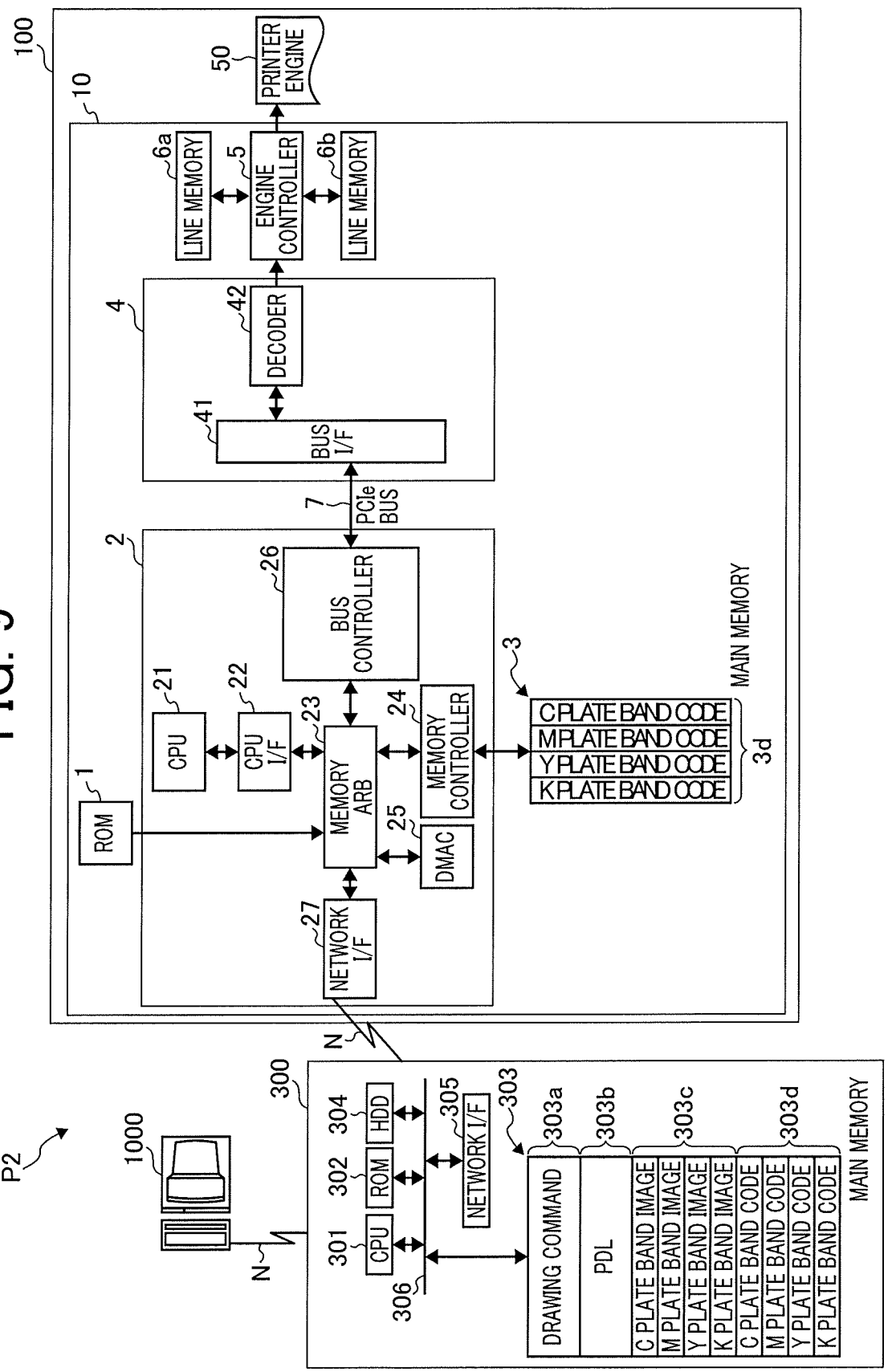
FIG. 9 is a hardware configuration diagram of a printer server that is an encoding apparatus of a second embodiment.

Next, a second embodiment will be described. FIG. 9 is hardware configuration diagrams of a printer server 300 that is an encoding apparatus of the second embodiment and an image forming apparatus 100.

A different point in the second embodiment from the first embodiment in FIG. 1 is that the printer server 300 is connected between the image forming apparatus 100 and a terminal device 1000 via a network N. Then, the image forming apparatus 100, the printer server 300, and the terminal device 1000 constitute a printing system P2.

The printer server 300 has a function to perform control to efficiently execute print instructions from a plurality of terminal devices to the image forming apparatus 100 in a system in which the plurality of terminal devices instructs printing to the image forming apparatus 100, as an example. In addition, there are cases where processing is performed according to a priority order or an access right of an instruction from a predetermined terminal to the image forming apparatus 100. Note that the terminal device 1000 may function as the printer server 300.

As for the hardware configuration of the image forming apparatus 100, the encoder 43 mounted in the image forming apparatus 100 has the function to encode image data in the first embodiment, whereas the printer server 300 has the function in the present embodiment, as will be described below.

Further, in the first embodiment, the drawing command area 3a, the PDL data area 3b, and the band image area 3c mounted in the image forming apparatus 100 have the functions to store the drawing command, the PDL data, and the band image data, respectively. In contrast, in the second embodiment, a main memory 3 of the image forming apparatus 100 may have at least a band code area 3d.

Other hardware configurations of the image forming apparatus 100 are similar to the hardware configurations of the first embodiment. Therefore, description is omitted.

Further, a hardware configuration of the printer server 300 according to the second embodiment will be described with reference to FIG. 9.

The printer server 300 includes a CPU 301, a ROM 302, a main memory 303, an HDD 304, and a network I/F 305, which are mutually connected via a system bus 306.

The CPU 301 executes an operating system (OS) and other various programs stored in the ROM 302 or the HDD 304 to control an operation of the entire printer server 300.

Further, an encoding program is stored in the ROM 302 or the HDD 304. This encoding program is not limited to being installed in the printer server 300 in advance, and may be provided by being stored in a readable storage medium or distributed via wired or wireless communicator. The CPU 301 of the printer server 300 has a function to execute the encoding program to encode image data, and the printer server 300 functions as an encoding apparatus in the second embodiment.

Here, the main memory 303 includes a storage area including a drawing command area 303a (illustrated as "drawing command" in FIG. 9), a PDL data area 303b (illustrated as "PDL data" in FIG. 9), a band image area 303c, and a band code area 303d. Detailed description of the respective areas is common to the description of the drawing command area 3a, the PDL data area 3b, the band image area 3c, and the band code area 3d in the first embodiment, and is thus omitted.

The network I/F 305 is a communicator that receives a print instruction from the terminal device 1000 and communicates with the image forming apparatus 100 via the network N, for example.

In addition, the printer server 300 may have a media I/F and the like for reading and writing various media.

Further, the printer server 300 may also serve as the terminal device 1000. That is, the printer server 300 as a single apparatus can operate as both the printer server 300 and the terminal device 1000 as long as a printer driver application, print instruction creation application software, and a printer driver are stored as various programs stored in the ROM 302 or the HDD 304.

Figure 10:
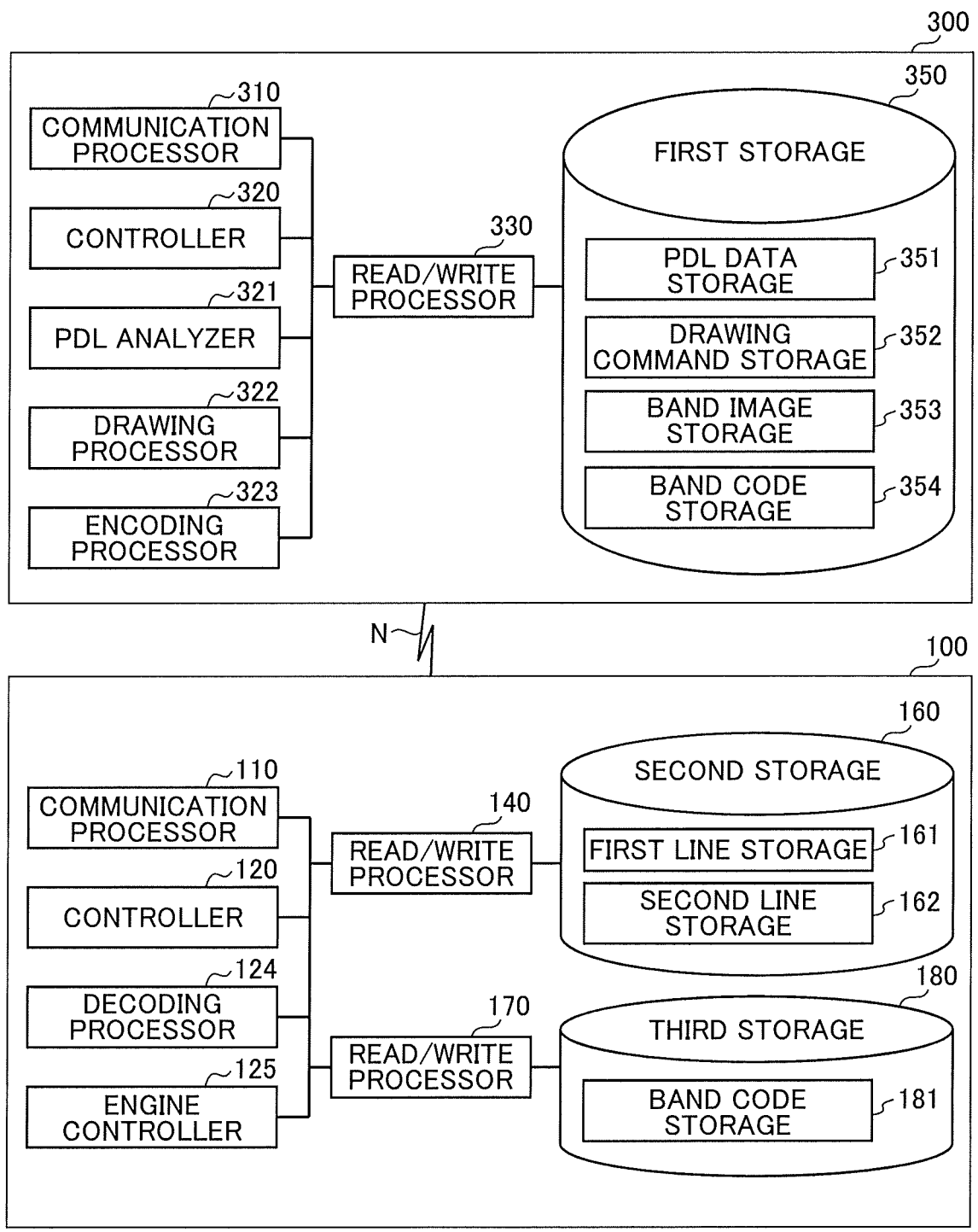
FIG. 10 is a functional block diagram of the printer server that is an encoding apparatus of the second embodiment.

FIG. 10 is a functional block diagram of the image forming apparatus 100 and the printer server 300 according to the second embodiment.

First, the printer server 300 includes a communication processor 310, a controller 320, a PDL analyzer 321, a drawing processor 322, an encoding processor 323, a read/write processor 330, and a first storage 350.

The communication processor 310 is implemented by processing of the network I/F 305, and executes a function to communicate with an external device such as the terminal device 1000 via the network.

The controller 320 is implemented by the CPU 301 executing a program stored in the ROM 302, the HDD 304, or the like, and functions as a printer controller that controls the entire printing system P2.

The PDL analyzer 321 is implemented by the CPU 301 executing a program stored in the ROM 302 or the HDD 304, and analyzes PDL data received from the terminal device 1000 to generate image data.

The drawing processor 322 is implemented by the CPU 301 executing a program stored in the ROM 302 or the HDD 304, and creates image data from a drawing command.

The encoding processor 323 is implemented by the CPU 301 executing the encoding program stored in the ROM 302 or the HDD 304, and generates band code data obtained by encoding the image data.

The read/write processor 330 is implemented by the CPU 301 executing the encoding program stored in the ROM 302 or the HDD 304, and executes functions to cause the first storage 350 to store various data and read the stored various data.

The first storage 350 is implemented by the main memory 303. The first storage 350 includes a PDL data storage 351, a drawing command storage 352, a band image storage 353, and a band code storage 354. The PDL data storage 351, the drawing command storage 352, the band image storage 353, and the band code storage 354 are respectively implemented by the drawing command area 303a, the PDL data area 303b, the band image area 303c, and the band code area 303d, and respectively execute functions to store PDL data, a drawing command, band image data as the image data, and band code data.

The image forming apparatus 100 includes a communication processor 110, a controller 120, a decoding processor 124, an engine controller 125, a read/write processor 140, a read/write processor 170, a second storage 160, and a third storage 180.

The communication processor 110 is implemented by processing of the network I/F 27, and executes a function to communicate with an external device such as the printer server 300 via the network.

The controller 120 is implemented by the CPU 21 executing a program stored in the ROM 1, the HDD, or the like, and functions as a printer controller that controls the entire printing system P2.

The decoding processor 124 is implemented by a decoder 42, decodes band code data, and generates image data, similarly to the first embodiment.

The engine controller 125 is implemented by an engine controller 5, and controls printing of an image by a printer engine 50, similarly to the first embodiment.

The read/write processor 140 is implemented by the engine controller 5, and executes functions to store image data in the second storage 160 and read the stored image data, similarly to the first embodiment.

The second storage 160 includes a first line storage 161 and a second line storage 162, similarly to the first embodiment. The first line storage 161 and the second line storage 162 are respectively implemented by a line memory 6a and a line memory 6b, and store a line unit of image data that is a decoded result.

The third storage 180 includes a band code storage 181, is implemented by the band code area 3d of the main memory 3, and executes a function to store the band code data.

A processing flow of the second embodiment will be described with reference to FIG. 3. The controller 120 and the controller 320 control the entire processing flow.

First, the communication processor 310 performs communication processing of receiving the PDL data generated by the printer server 300 (S1).

The read/write processor 330 causes the PDL data storage 351 to store the PDL data received by the communication processor 310 (S2).

The PDL analyzer 321 reads the PDL data via the read/write processor 330 and generates a drawing command from the PDL data (S3).

The read/write processor 330 causes the drawing command storage 352 to store the drawing command generated by the drawing processor 322 (S4).

The drawing processor 322 reads the drawing command via the read/write processor 330 and generates CMYK image data from the drawing command (S5).

The read/write processor 330 causes the band image storage 353 to store the image data generated by the drawing processor 322 (S6).

The encoding processor 323 reads the image data via the read/write processor 330 and encodes the image data to generate CMYK band code data (S7).

The read/write processor 330 causes the band code storage 354 to store the band code data generated by the encoding processor 323 (S8).

The decoding processor 124 acquires the band code data from the band code storage 354 via the read/write processor 170 and the communication processor 110, reads and decodes the band code data stored in the band code storage 181, and transfers the decoded data, that is, the image data to the engine controller 125 (S10).

The engine controller 125 performs printing on a storage medium such as a paper on the basis of the transferred image data (S11).

Here, data transferred within the printing system P2 at the time of execution of the flow described in FIG. 3 in the second embodiment will be described. Hereinafter, data transfer processing T5, T6, T7, T8, and T9 will be described again with reference to FIG. 9.

The controller 320 reads the band image data in the band image area 303c (T5), executes the encoding program to encode the band image data, and writes the band code data generated as a result of encoding to the band code area 303d (T6).

Next, the controller 320 transfers the band code data from the band code area 303d to the main memory 3 in order to store the band code data in the band code area 3d via various buses (T7). Further, the controller 120 transfers the band code data in the band code area 3d to the decoder 42 via various buses in synchronization with a printing operation of the printer engine 50 (T8).

Then, the decoder 42 decodes the band code data. The controller 120 transfers the decoded image data to the engine controller 5, and the engine controller 5 sequentially writes the band image data to either one of the two line memories 6a and 6b on a line basis and then transfers the image data from the line memory 6a or 6b to which the image data has been written to the printer engine 50. That is, the controller 120 transfers the image data that is a decoded result from the decoder 42 to the engine controller 5 as transfer processing T9, and the image data is transferred line by line from the engine controller 5 to the line memory 6a or the line memory 6b, and is then transferred from the line memory 6a or the line memory 6b to the printer engine 50 via the engine controller 5 again in synchronization with the printing operation of the printer engine 50 (T9).

In T9, the printer engine 50 includes two line memories 6a and 6b and transfers the image data line by line at the timing synchronized with the printing operation of the printer engine 50 using the line memory 6a or 6b. Therefore, if the data transfer processing in T8 and T9 is not in time with the linear speed of one line of the printer engine 50 due to a low transfer rate of the PCIe bus 7, for example, abnormality occurs in a printed image.

Here, in conventional encoding, the code length when encoding a line unit of image data is not controlled. Therefore, the code data sometimes expands. In that case, the amount of code data to be transferred increases. In addition, if a condition to slow down the data transfer speed other than the amount of data to be transferred, such as a condition that the transfer speed of the bus is not so high or a condition that WAIT enters due to memory contention in the CPU 21 coincides, the time required for transfer further increases and necessary image data cannot be sometimes transferred in time with the linear speed of the printer engine 50.

Therefore, the present embodiment provides an encoding apparatus and an encoding method that prevent code data from expanding on a line basis as a result of carrying out encoding.

Figure 11:
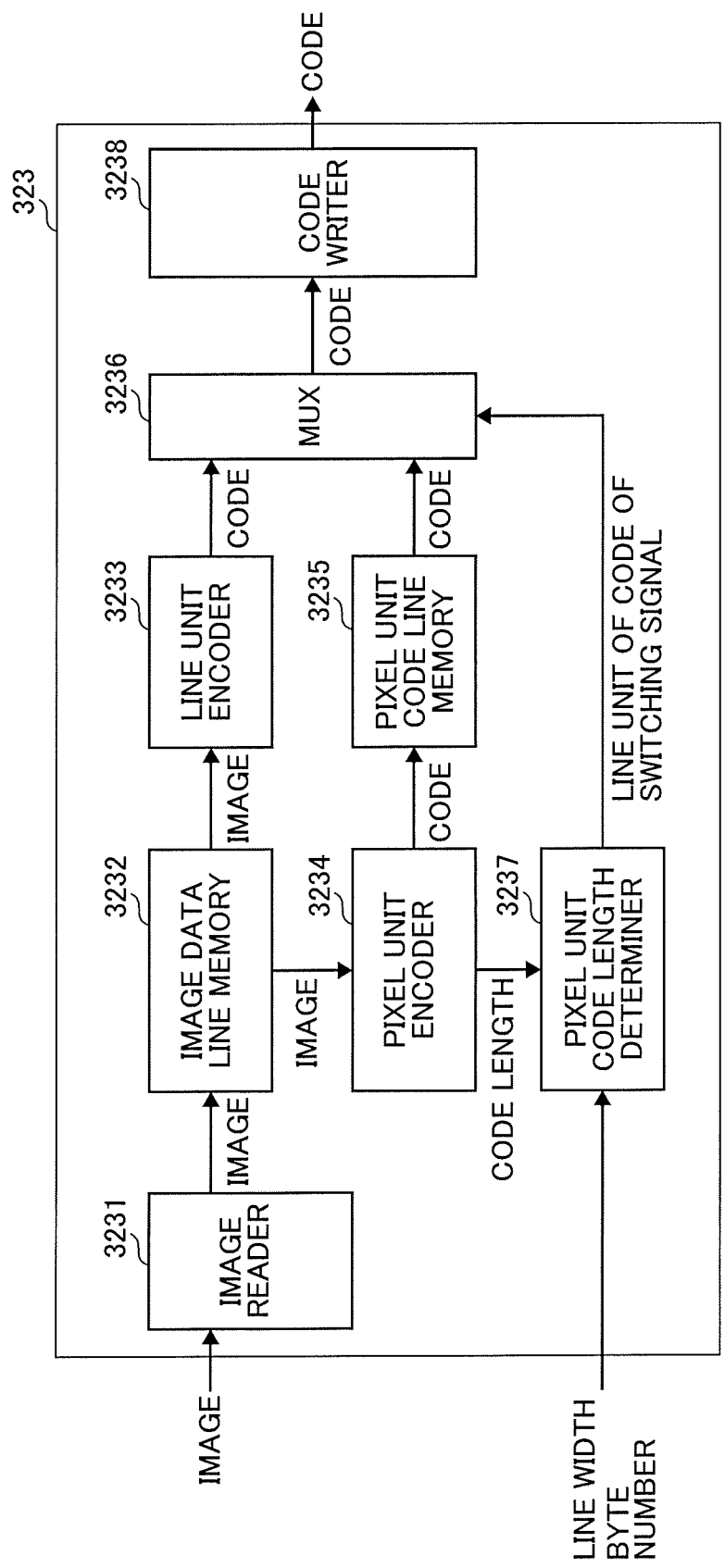
FIG. 11 is a second example of a functional block diagram of an encoding processor.

FIG. 11 is a detailed functional block diagram of the encoding processor 323 in the second embodiment. Steps of encoding processing of the second embodiment will be described with reference to the block diagram of FIG. 11. Note that, in FIG. 11, the image data is abbreviated as "image" and the code data is abbreviated as "code".

An image reader 3231 has a function to read a predetermined plurality of pixel units of image data. That is, the image data transferred by the controller 320 and input to the encoding processor 323 is read on a predetermined plurality of pixels basis. In the present embodiment, as an example, a case in which the image reader 3231 reads the band image data input to the encoding processor 323 on one line of a plurality of pixels basis, as a predetermined plurality of pixel units of image data, will be described. However, the embodiment is not limited to this example.

The image reader 3231 inputs predetermined unit image data that is the read predetermined plurality of pixel units of image data to an image data line memory 3232.

The image data line memory 3232 as a predetermined unit image data storage temporarily stores the image data that is one line of input pixels.

A line unit encoder 3233 as a predetermined unit encoder reads the image data from the image data line memory 3232, encodes the image data on a line basis, and inputs line code data as an encoding result to an output code selector 3236 to be described below. Note that the output code selector 3236 is illustrated as MUX (multiplexer) in FIG. 11.

A pixel unit encoder 3234 as pixel-by-pixel encoding reads the image data from the image data line memory 3232 and encodes the image data on a pixel basis, and inputs the pixel unit code data as an encoding result to a pixel unit code line memory 3235.

A pixel unit code data line memory 3235 as a pixel unit code data storage temporarily stores one line of pixel unit code data.

A pixel unit code length determiner 3237 determines a code length of the pixel unit code data. That is, first, the pixel unit code length determiner 3237 acquires one line of width, for example, a byte number (illustrated as line width byte number in FIG. 11) of the image data transferred by the controller 320 and input to the encoding processor 323. Then, the pixel unit code length determiner 3237 compares the one line of width of the image data with the code length of the one line of pixel unit code data input from the pixel unit encoder 3234.

At this time, when the code length of the pixel unit code is longer than the one line of width of the image data, occurrence of expansion of data due to the pixel-by-pixel encoding is determined. That is, the amount of data to be transferred can be small on the system by selecting the line unit code data as code data. Therefore, the pixel unit code length determiner 3237 inputs a switching signal to cause an output code selector 3236 to use the line unit code data. The amount of data to be transferred is smaller in the pixel unit code data as code data if the code length of the pixel unit code is shorter. Therefore, the switching signal is input to use the pixel unit code data. In this way, the pixel unit code length determiner 3237 inputs which code is to be used to the output code selector 3236 as a result of determination.

The output code selector 3236 performs processing of selecting the code to be output on the basis of the determination result of the pixel unit code length determiner 3237.

A code writer 3238 performs storing by writing the band code data received from the output code selector 3236 to the band code storage 354.

Figure 12:
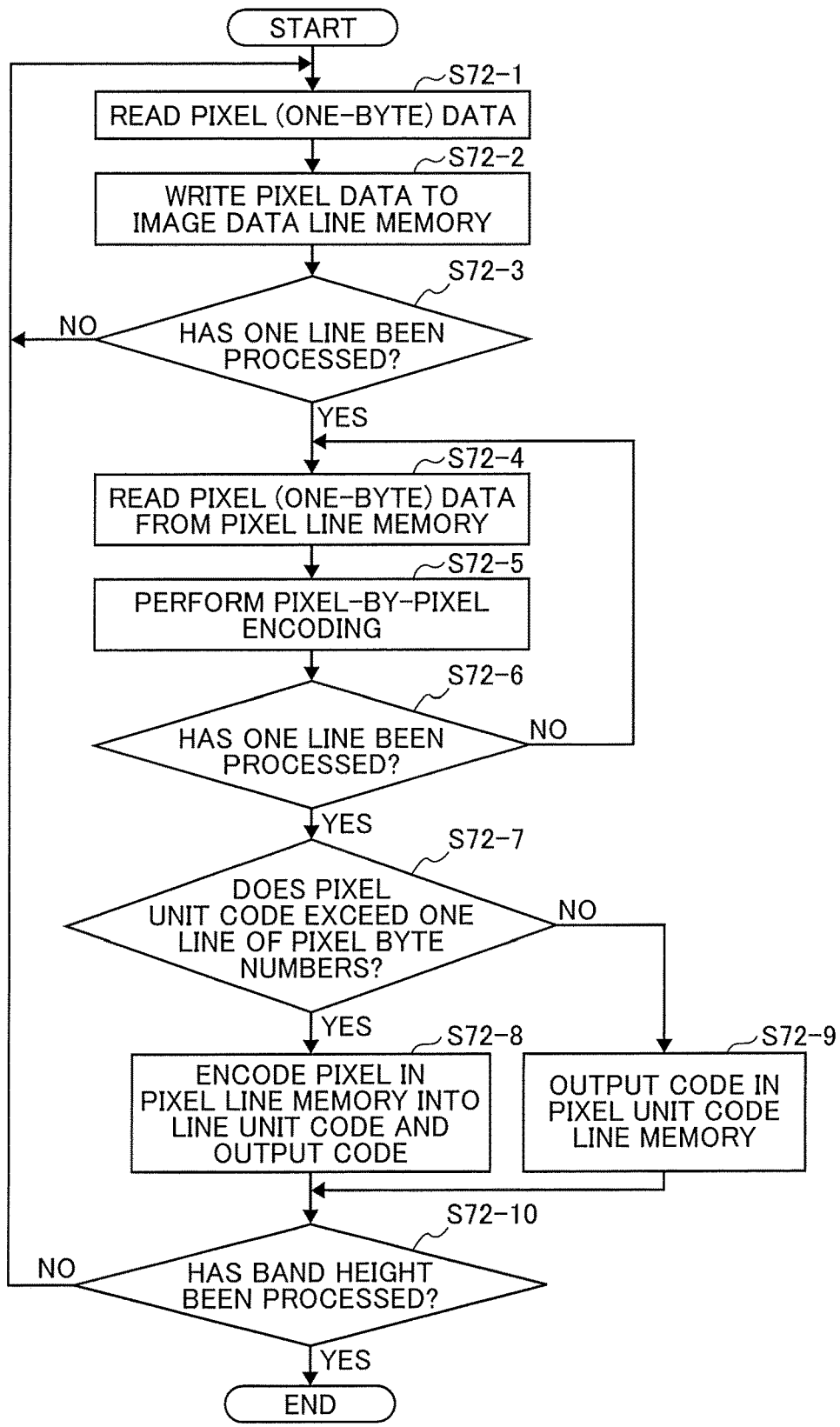
FIG. 12 is a second example of a flowchart of encoding processing.

FIG. 12 is a flowchart of the encoding processing of the encoding processor 323 in FIG. 11. In particular, steps up to a step of inputting code data to the output code selector 3236 will be described.

First, the image reader 3231 reads, as an image reading step, pixel data, that is, one byte of image data (S72-1), and writes, as a predetermined unit image data storing step, the image data to the image data line memory 3232 (S72-2).

The encoding processor 323 repeats data read and write of S72-1 and S72-2 until completion of one line, and moves onto the next step when processing for one line is completed (S72-3).

Next, the pixel unit encoder 3234 reads, as a pixel-by-pixel encoding step, the image data from the image data line memory 3232 (S72-4), and performs pixel-by-pixel encoding (S72-5).

The line unit encoder 3233 repeats the encoding processing of S72-4 and S72-5 until completion of the encoding processing for one line, and moves onto the next step when the processing for one line is completed (S72-6).

In the next step, the pixel unit code length determiner 3237 determines whether the generated pixel unit code data exceeds one line of pixel byte number, and inputs the switching signal to the output code selector 3236 (S72-7).

The output code selector 3236 causes the line unit encoder 3233 to encode the image data in the image data line memory 3232 and outputs the generated line unit code data in a case where the code length of the pixel unit code exceeds the width of one line of the image data (S72-8), and selects and outputs the pixel unit code data stored in the pixel unit code line memory 3235 in a case where the code length does not exceed the width (S72-9) on the basis of the switching signal from the pixel unit code length determiner 3237.

Then, the encoding processor 323 repeats the processing of S72-1 to S72-9 until completion of the encoding processing for band height, and terminates the processing when the processing for one band is completed (S72-10).

As described above, in the second embodiment, the predetermined unit of image data, that is, a line unit of image data is first kept in the image data line memory 3232, and the line-by-line encoding is not performed. Then, in a case where expansion of the pixel unit code data is determined by the pixel unit code length determiner 3237, the predetermined unit-by-unit encoding, that is, the line-by-line encoding is performed.

That is, two encoding methods are serially performed, rather than in parallel. Therefore, wasteful line-by-line encoding processing is not performed. Therefore, in the present embodiment, the encoding can be speeded up and the load applied to the system can be reduced in addition to the effects of the first embodiment.

Further, the processing of reading and encoding the once stored image data from the line memory requires a relatively long time when executed by hardware such as ASIC. Therefore, the encoding processing of the present embodiment can be more effectively performed at a high processing speed when executed by software with a program.

Note that the encoding processing executed by the encoder 43 in the first embodiment can be executed by the CPU 21 by storing the program executed in the encoding processing to the ROM 1 or the HDD. Further, the encoding processing executed by the encoding program in the second embodiment can be executed in the printing system P1 of the first embodiment by providing a circuit such as ASIC that performs the encoding processing as the encoder 43 of the first embodiment.

Figure 13:
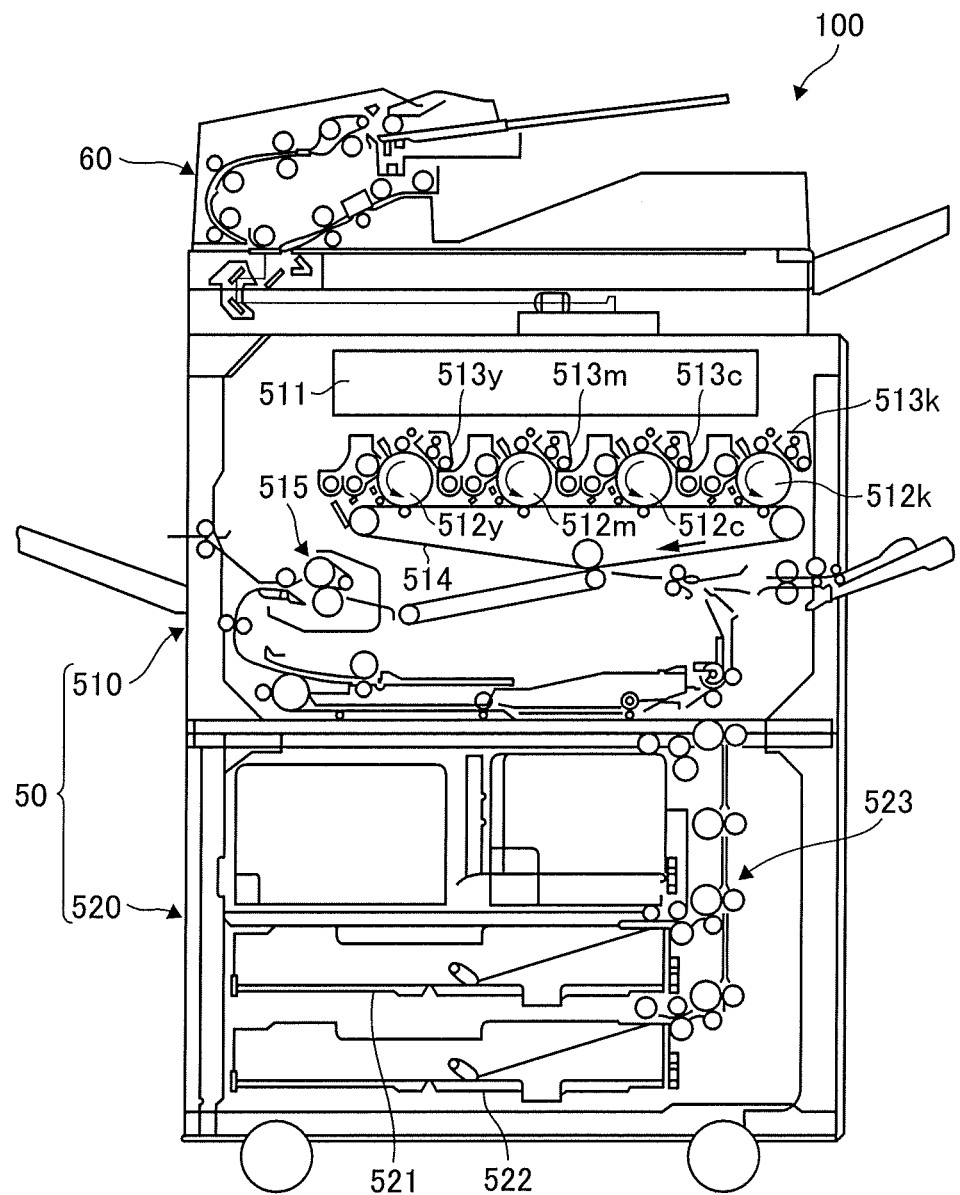
FIG. 13 is a hardware structure diagram of a printer engine 50.

FIG. 13 is a hardware structure diagram of the above-described printer engine 50. The printer engine 50 includes an image former 510 and a paper feeder 520.

The paper feeder 520 includes paper feeding cassettes 521 and 522 that house recording papers having different paper sizes, and sheet feeder 523 including various rollers that convey the recording paper housed in the paper feeding cassettes 521 and 522 to the image former 510.

The image former 510 includes an exposure device 511, photoconductor drums 512*y*, 512*m*, 512*c*, and 512*k*, developing devices 513*y*, 513*m*, 513*c*, and 513*k*, a transfer belt 514, and a fixing device 515.

First, the exposure device 511 exposes the photoconductor drums 512*y*, 512*m*, 512*c*, and 512*k* on the basis of the image data, and latent images are formed on the respective photoconductor drums 512*y*, 512*m*, 512*c*, and 512*k*. The developing devices 513*y*, 513*m*, 513*c*, and 513*k* supply toners of different colors, that is, Y, M, C, and K toners to the photoconductor drums 512*y*, 512*m*, 512*c*, and 512*k*, respectively, to develop images.

Then, four toner images in different toner colors developed on the photoconductor drums 512*y*, 512*m*, 512*c*, and 512*k* are transferred to and superimposed on the transfer belt 514. Further, the toner images transferred on the transfer belt 514 are transferred to a recording paper supplied from the paper feeder 520. The fixing device 515 melts the toners of the toner images transferred on the recording paper to fix a color image on the recording paper, and discharges the recording paper to the outside of the image forming apparatus 100.

The image forming apparatus 100 may further include a scanner 60 for optically reading a document. For the image formation in the printer engine 50, an inkjet method or the like can be employed other than the above-described electrophotography method. However, the method is not limited to these methods.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An encoding apparatus comprising circuitry configured to:
   read predetermined unit image data that is a predetermined plurality of pixel units of image data;
   generate pixel unit code data obtained by encoding the read predetermined unit image data on a pixel basis;
   generate predetermined unit code data obtained by encoding the read predetermined unit image data on a predetermined unit basis;
   compare a code length that is a data amount of the pixel unit code data with a data amount of the predetermined unit image data to make determination; and
   output the predetermined unit code data in a case where the code length is greater than the data amount of the predetermined unit image data and output the pixel unit code data in a case where the code length is not greater than the data amount of the predetermined unit image data, on basis of a result of the determination.

2. The encoding apparatus according to claim 1, wherein the circuitry is configured to perform encoding of the read predetermined unit image data on the pixel basis and encoding of the read predetermined unit image data on the predetermined unit basis in parallel.

3. The encoding apparatus according to claim 1, wherein the predetermined plurality of pixel units is a number of pixels in one line.

4. The encoding apparatus according to claim 1, wherein an expansion rate of a worst compression rate of a predetermined unit encoder is smaller than an expansion rate of a worst compression rate of a pixel unit encoder.

5. An encoding apparatus comprising:
   a memory; and
   circuitry configured to:
   read predetermined unit image data that is a predetermined plurality of pixel units of image data; store the read predetermined unit image data in the memory;
   generate pixel unit code data obtained by encoding the read predetermined unit image data on a pixel basis;
   generate predetermined unit code data obtained by encoding the predetermined unit image data stored in the memory on a predetermined unit basis;
   compare a code length that is a data amount of the pixel unit code data with a data amount of the predetermined unit image data to make determination; and
   output the encoded predetermined unit code data in a case where the code length is greater than the data amount of the predetermined unit image data and output the pixel unit code data in a case where the code length is not greater than the data amount of the predetermined unit image data, on basis of a result of the determination.

6. The encoding apparatus according to claim 5, wherein the circuitry is configured to serially perform encoding of the read predetermined unit image data on the pixel basis and encoding of the predetermined unit image data stored in the memory on the predetermined unit basis.

7. The encoding apparatus according to claim 6, wherein the circuitry is configured to perform the encoding of the predetermined unit image data stored in the memory on the predetermined unit basis in a case where the code length is larger than the data amount of the predetermined unit image data on basis of the result of the determination.

8. The encoding apparatus according to claim 5, wherein the predetermined plurality of pixel units is a number of pixels in one line.

9. The encoding apparatus according to claim 5, wherein an expansion rate of a worst compression rate of a predetermined unit encoder is smaller than an expansion rate of a worst compression rate of a pixel unit encoder.

10. An encoding method comprising:

reading predetermined unit image data that is a predetermined plurality of pixel units of image data;

storing the read predetermined unit image data;

generating pixel unit code data obtained by encoding the read predetermined unit image data on a pixel basis;

comparing a code length that is a data amount of the pixel unit code data with a data amount of the predetermined unit image data to make determination; and outputting predetermined unit code data generated by encoding the predetermined unit image data stored by the storing, on a predetermined unit basis, in a case where the code length is greater than the data amount of the predetermined unit image data, and outputting the pixel unit code data in a case where the code length is not greater than the data amount of the predetermined unit image data, on basis of a result of the determination.

\* \* \* \* \*